United States Patent [19]

Yamazaki et al.

[11] Patent Number: 5,714,275
[45] Date of Patent: Feb. 3, 1998

[54] MAGNETIC RECORDING MEDIUM

[75] Inventors: Nobuo Yamazaki; Hitoshi Noguchi; Shinji Saito, all of Kanagawa, Japan

[73] Assignee: Fuji Photo Film Co., Ltd., Kanagawa, Japan

[21] Appl. No.: 571,397

[22] Filed: Dec. 13, 1995

[30] Foreign Application Priority Data

Dec. 16, 1994 [JP] Japan .................................. 6-333575

[51] Int. Cl.$^6$ .................................. G11B 5/66; G11B 5/70
[52] U.S. Cl. .................................. 428/694 B; 428/694 BS; 428/694 BA; 428/694 BM; 428/694 BN; 428/900
[58] Field of Search .................................. 428/330, 331, 428/694 B, 694 BA, 694 BM, 694 BS, 694 BN, 900, 323, 328, 329; 148/100, 105

[56] References Cited

U.S. PATENT DOCUMENTS

| 5,114,801 | 5/1992 | Aoki et al. | 428/694 |
| 5,176,955 | 1/1993 | Ejiri et al. | 428/336 |
| 5,534,361 | 7/1996 | Hisano et al. | 428/694 RE |
| 5,540,975 | 7/1996 | Masaki | 428/141 |
| 5,591,535 | 1/1997 | Hisano et al. | 428/694 RE |

Primary Examiner—Paul J. Thibodeau
Assistant Examiner—Stephen Sand
Attorney, Agent, or Firm—Sughrue, Mion, Zinn, Macpeak & Seas, PLLC

[57] ABSTRACT

A magnetic recording medium is described, comprising a nonmagnetic support having provided thereon at least a magnetic layer comprising ferromagnetic metal particles dispersed in a binder, wherein the magnetic layer has a coercive force, Hc, of from 1,500 to 4,000 Oe and an Hc/HK ratio of Hc to an anisotropy field, HK, of from 0.30 to 1.00.

6 Claims, 2 Drawing Sheets

MAGNETIC RECORDING MEDIUM

FIELD OF THE INVENTION

The present invention relates to a magnetic recording medium for high-density recording which has one or more magnetic layers or has at least one magnetic layer and a nonmagnetic layer and which contains ferromagnetic metal particles in the uppermost layer.

BACKGROUND OF THE INVENTION

Widely used conventional magnetic recording media, such as video tapes, audio tapes, and magnetic disks, comprise a nonmagnetic support having thereon a magnetic layer comprising particles of ferromagnetic iron oxide, Co-modified ferromagnetic iron oxide, $CrO_2$, ferromagnetic metal particles, or hexagonal ferrite dispersed in a binder. Among these, ferromagnetic metal particles have excellent suitability for high-density recording.

That anisotropy field HK influences the electromagnetic characteristics of a magnetic recording medium is disclosed, for example, in JP-A-3-286420 (the term "JP-A" as used herein means an "unexamined published Japanese patent application") and *IEEE. Trans. Mag.*, Vol. 24, No. 6, Nov. 1988, p. 2850. Also disclosed is that the anisotropy field HK of a hexagonal ferrite influences the electromagnetic characteristics of a magnetic recording medium. The former reference discloses a magnetic recording medium which comprises two magnetic layers formed on a nonmagnetic layer, the lower magnetic layer having an axis of easy magnetization in the lengthwise direction and the upper magnetic layer containing magnetic particles having an anisotropy field of 3,000 Oe or less. There is a description therein to the effect that the magnetic recording medium shows high output over a wide wavelength range from a long to a short wavelength.

The magnetic recording medium disclosed in JP-A-3-286420 is based on the idea that anisotropy field HK is reduced by using a hexagonal ferrite. However, the mere reduction in HK has failed to sufficiently improve output and C/N. There is no description therein which suggests an improvement in properties of a magnetic recording medium containing ferromagnetic metal particles.

Although *IEEE. Trans. Mag.*, Vol. 24, No. 6, Nov. 1988, p. 2850 discloses the influence of the HK of Ba ferrite, there is no description therein which suggests an improvement in properties of a magnetic recording medium containing ferromagnetic metal particles.

Consequently, there is a desire for a magnetic recording medium containing ferromagnetic metal particles and having sufficiently high performances.

SUMMARY OF THE INVENTION

An object of the present invention is to provide a magnetic recording medium remarkably improved in electromagnetic characteristics, especially in short-wavelength output necessary to high-density recording, which property has long been required of magnetic recording media, and in C/N.

This and other objects of the present invention have been attained by a magnetic recording medium comprising a nonmagnetic support having provided thereon at least a magnetic layer comprising ferromagnetic metal particles dispersed in a binder, wherein the magnetic layer has a coercive force, Hc, of from 1,500 to 4,000 Oe (oersted) and an Hc/HK ratio of Hc to an anisotropy field, HK, of from 0.30 to 1.00.

DETAILED DESCRIPTION OF THE INVENTION

Although the reason why the magnetic recording medium of the present invention shows excellent electromagnetic characteristics has not been elucidated, the following explanations are possible. The Hc/HK ratio in a magnetic layer, i.e., the ratio of coercive force Hc to anisotropy field HK, is a factor which influences the mechanism of the reversal of magnetization; a magnetic layer having a higher Hc/HK ratio has a greater possibility that the reversal of magnetization occurs as a result of simultaneous rotation. That is, magnetic materials which attain a higher Hc value are more apt to undergo such phenomenon than magnetic materials showing the same HK value. It is presumed that a magnetic layer in which the reversal of magnetization occurs as a result of simultaneous rotation shows more rapid switching with changing recording magnetic field and, hence, the regions of the reversal of magnetization which are recorded on the magnetic recording medium account for a reduced proportion. Namely, it is thought that a magnetic recording medium having a high Hc/HK ratio basically has the ability to attain high output. On the other hand, rapid switching tends to disadvantageously cause demagnetization, i.e., the phenomenon in which recorded signals are erased when the recording head separates from the recording medium. Consequently, a high Hc/HK ratio alone is incapable of enabling the magnetic recording medium to fully exhibit the basic high-output performance. It is thought that the Hc should be increased in order to inhibit demagnetization as much as possible. To sum up, a magnetic recording medium having a high Hc/HK ratio basically has the ability to attain high output, but it should further has a high Hc value so as to fully exhibit that performance. The magnetic recording medium of this invention satisfies the above requirement, and this is thought to be the reason why the magnetic recording medium of the invention has high output. In addition, by the use of fine ferromagnetic metal particles for diminishing the noise resulting from the increased output, the magnetic recording medium of the invention can have both high output and a high C/N ratio.

In the present invention, the ratio of Hc/HK is from 0.30 to 1.00, preferably from 0.5 to 1.00, and more preferably from 0.7 to 1.00. Although the upper limit of Hc/HK is uncertain, it is theoretically 1.00. Hc is usually from 1,500 to 4,000 Oe, preferably from 1,700 to 3,000 Oe.

Although the upper limit of Hc varies depending on head materials, it is thought to be about 4,000 Oe.

Figure 1:
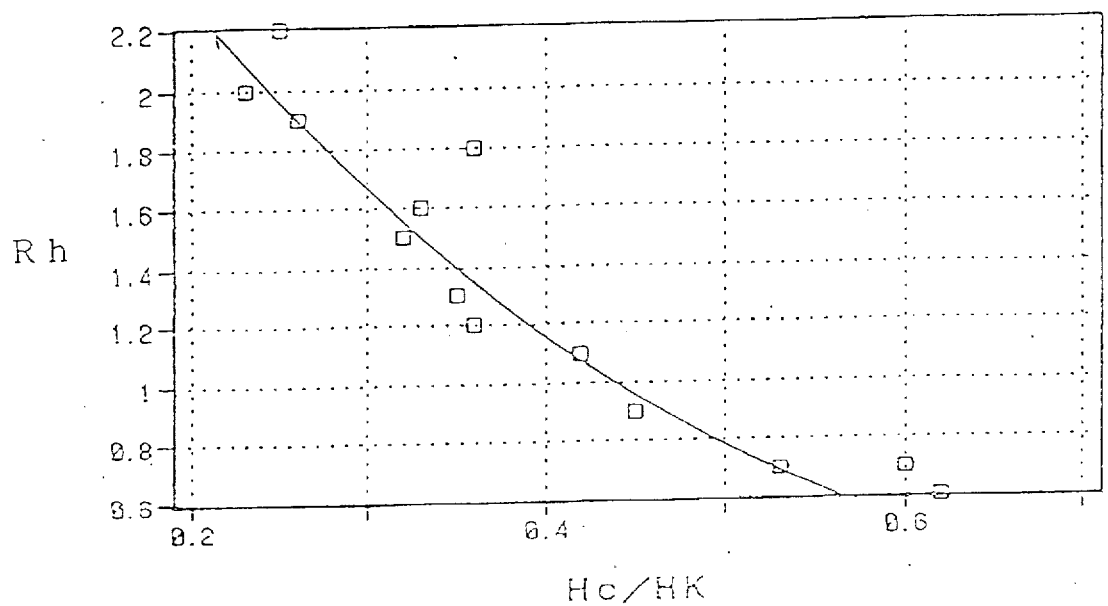
FIG. 1 is a graph obtained by plotting Rh against Hc/HK.
Figure 2:
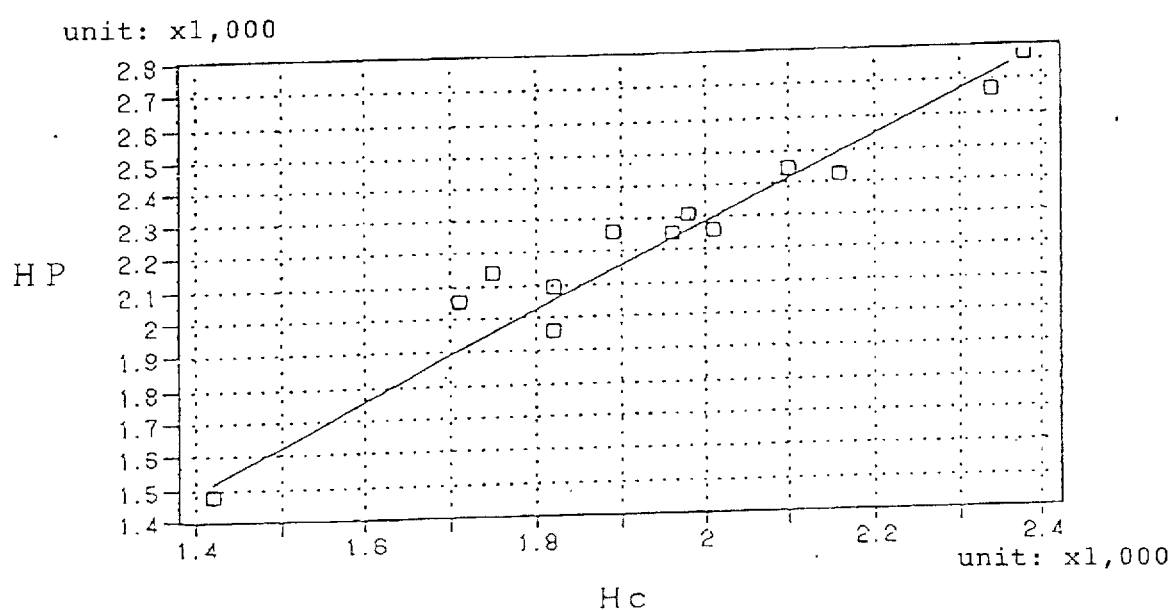
FIG. 2 is a graph obtained by plotting HP against Hc.

The ratio of Hc/HK is a parameter which correlates with Rh (rotational hysteresis integral); Hc/HK values of 0.30 and higher correspond to Rh values of 1.7 and lower (an example of plot of Hc/HK against Rh is shown in FIG. 1). HP (magnetic field at the peak of a rotational hysteresis loss Wr curve) correlates with Hc (a example of plot of HP against Hc is shown in FIG. 2).

In the magnetic recording medium of the invention which has improved short-wavelength output, the ferromagnetic metal particles are preferably fine particles because noise increases with increasing output. The ferromagnetic metal particles have usually a major-axis length of from 0.01 to 0.30 μm, preferably from 0.01 to 0.15 μm, and more preferably from 0.03 to 0.08 μm.

In the present invention, the magnetic layer containing ferromagnetic metal particles may be formed on a nonmagnetic support, on a nonmagnetic layer formed on a nonmagnetic support and comprising inorganic nonmagnetic particles dispersed in a binder, on a magnetic layer (lower magnetic layer) comprising ferromagnetic particles dispersed in a binder, or on layers comprising the nonmagnetic layer and the lower magnetic layer. If a nonmagnetic layer or a lower magnetic layer is formed, the layer containing ferromagnetic metal particles is often referred to as an upper layer or an upper magnetic layer, and the nonmagnetic layer and/or lower magnetic layer is often referred to as a lower layer. Further, if the magnetic layer formed without a lower layer and the magnetic layer containing ferromagnetic metal particles and formed on a lower layer are inclusively referred to, these magnetic layers are simply called a magnetic layer. If a nonmagnetic layer and a lower magnetic layer are formed as lower layers, either layer may be formed first, and the effects of the invention are basically obtainable regardless of the sequence of layer formation. If necessary, the magnetic layer and the nonmagnetic layer each may have a multilayer structure.

The upper layer may contain another kind of ferromagnetic particles in combination with the ferrite particles if needed. However, the proportion of the ferromagnetic metal particles is usually from 50 to 100% by weight, preferably from 80 to 100% by weight, based on all ferromagnetic particles in the upper layer. The ferromagnetic particles for use in the lower layer are not particularly limited, and the same ferromagnetic metal particles as in the upper layer are usable. The lower layer is free from the requirements concerning Hc and Hc/HK. The term "ferromagnetic particles" used hereinafter means any kind of ferromagnetic particles including ferromagnetic metal particles, unless otherwise indicated.

A lower nonmagnetic layer is preferably provided between the magnetic layer and the support, because the formation of a lower nonmagnetic layer not only contributes to an improvement in surface properties but also facilitates a thickness reduction for the upper layer. A lower magnetic layer containing acicular ferromagnetic particles or other magnetic particles is also preferably provided as another lower layer between the upper magnetic layer and the support, because the lower magnetic layer contributes to an improvement in long-wavelength electromagnetic characteristics.

The residual magnetic flux density (Br) of the magnetic layer is preferably 2,000 G or more. If the Br thereof is less than 2,000 G, output decreases over the whole wavelength region. There is no particular upper limit to the Br thereof; however, the upper limit thereof is preferably 4,000 G. The SFD of the magnetic layer is 0.8 or less, preferably 0.5 or less.

The magnetic layer has an in-plane squareness ratio (SQ) of usually from 0.5 to 0.98, preferably from 0.8 to 0.98. SQ values lower than 0.5 are undesirable because output is reduced. In the case of an acicular magnetic material, higher SQ values result in higher output.

HK is usually 9,000 Oe or lower, preferably 7,000 Oe or less. HK values exceeding 9,000 Oe result in reduced output.

The thickness of the magnetic layer is preferably 3 μm or less, and may be varied according to purposes. For example, if the magnetic layer containing ferromagnetic metal particles is the only magnetic layer, the thickness thereof is preferably from 0.5 to 3 μm. If a lower layer is provided, the thickness of the upper layer is preferably from 0.01 to 1 μm.

If a lower magnetic layer is provided, the ferromagnetic particles contained therein are preferably fine ferromagnetic particles of metal mainly comprising iron as or particles of either cobalt-modified iron oxide or iron oxide. If a lower nonmagnetic layer is provided, the inorganic nonmagnetic particles contained therein are preferably particles of at least one of titanium dioxide, barium sulfate, zinc oxide, and α-iron oxide.

The lower layer and the upper layer are preferably coated by a wet-on-wet coating method according to U.S. Pat. No. 4,844,946.

Examples of methods that can be used for practicing the present invention include the following. However, usable methods are not limited thereto, and methods other than those can be used to attain the object of the invention as long as the requirements specified hereinabove are satisfied.

A magnetic coating fluid for upper-layer formation containing ferromagnetic metal particles dispersed therein and a coating fluid for lower-layer formation containing nonmagnetic or ferromagnetic particles dispersed therein are applied to a nonmagnetic support in such amounts that the resulting upper layer containing ferromagnetic metal particles has a thickness of 3.0 μm or smaller on a dry basis. Before the coating dries, the coated support is passed through a magnetic field for longitudinal orientation. Calendering is then conducted with metal rolls arranged in a multi-stage stack. Thus, the magnetic recording medium of the present invention can be produced.

The ferromagnetic metal particles for use in the present invention are explained below.

The ferromagnetic metal particles are not particularly limited as long as the magnetic layer containing the ferromagnetic particles can be regulated so as to have a given Hc/HK value. However, preferred examples thereof include ferromagnetic metal particles mainly comprising α-Fe.

Methods for regulating Hc/HK include:
(i) to reduce the particle size of the ferromagnetic metal particles; and
(ii) to select the composition of the ferromagnetic metal particles.

The particle size reduction (i) may be accomplished, for example, by selecting various conditions for the preparation of goethite from a ferrous salt, e.g., hydroxyl group concentration, reaction temperature, during the formation of ferrous hydroxide, and aeration conditions for the oxidation of the ferrous hydroxide, or by selecting conditions for the reduction of goethite.

As stated hereinabove, the particle size of the ferromagnetic metal particles is such that the major-axis length thereof is usually from 0.01 to 0.30 μm, preferably from 0.01 to 0.15 μm, and more preferably from 0.03 to 0.08 μm. The specific surface area thereof as measured by the BET method is generally from 30 to 100 m$^2$/g. A larger specific surface area is preferable in attaining a noise reduction, but results in poor dispersibility. Hence, the specific surface area of the ferromagnetic metal particles is preferably from 40 to 80 m$^2$/g. The crystallite size of the ferromagnetic metal particles is from 80 to 300 Å, preferably from 100 to 200 Å. The aspect ratio (major-axis length/minor-axis length) of the ferromagnetic metal particles is from 3 to 15, preferably from 5 to 10. Too low aspect ratios tend to result in reduced Hc; while too high aspect ratios result in poor dispersibility.

For accomplishing the compositional selection (ii), use may be made of, e.g., (a) a technique of using a sintering inhibitor or (b) a technique of selectively using additive elements, both techniques being used during the preparation of ferromagnetic metal particles.

Technique (a) is explained first below.

If sintering occurs during production of ferromagnetic metal particles, larger particles result and a reduced Hc/HK ratio results as stated hereinabove. However, by use of a sintering inhibitor, the ferromagnetic metal particles can be prevented from sintering and can have a small size, thereby attaining a high Hc/HK ratio.

Although a known sintering inhibitor may be used, preferred sintering inhibitors are those comprising at least one element selected from the group consisting of Al, Si, Y, and Nd. In the case of using a combination of two or more elements, examples of such element combinations include Al—Nd, Al—B, Al—Y, Al—Si—La, and Al—Nd.

The sintering inhibitor is used, for example, in such an amount that the amount of each sintering-inhibiting element is usually from 0.005 to 0.20 mol, preferably from 0.01 to 0.10 mol, per mol of the iron atoms contained in the ferromagnetic metal particles prepared.

The sintering inhibitor is usually in the form of a water-soluble compound and mixed as an aqueous solution with goethite. This sintering inhibitor may be added together with additive elements, which will be described below.

Technique (b) is then explained.

Additive elements become components of ferromagnetic metal particles. Selective use of additive elements enables the control of goethite form, whereby the aspect ratio and size of the resulting ferromagnetic metal particles can be regulated.

Conventionally known additive elements can be used either alone or in combination of two or more thereof. Examples thereof include Co, Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb. Among these, preferred are Co, Zn, Ni, and Si. The additive elements are usually in the form of a water-soluble salt and added as an aqueous solution to a ferrous salt or to goethite together with the sintering inhibitor as stated above.

Such additive elements are used, for example, in such an amount that the amount of each additive element is usually from 0.0001 to 0.40 mol, preferably from 0.01 to 0.35 mol, per mol of the iron atoms contained in the ferromagnetic metal particles prepared. In particular, Co is useful for increasing saturation magnetization, and is preferably used in an amount of about 0.3 mol per mol of Fe.

The basic difference between a sintering inhibitor and an additive element is that the former is present near the surface of the particles.

The above-described treatment with a sintering inhibitor and an additive element in the present invention not only enables the ferromagnetic metal particles to give a magnetic layer having a regulated Hc/HK value, but also results in the formation of an oxide layer on the surface of the ferromagnetic metal particles to enhance the oxidative stability of the particles. The thickness of the oxide layer is usually from 5 to 50 Å, preferably from 10 to 40 Å. Too large thicknesses of the oxide layer result in a reduced σs. The partial presence of either a compound of any of the aforementioned additive elements or the metal thereof on the particle surface enables a further enhancement in oxidative stability.

The ferromagnetic metal particles that can be used in the present invention have a σa of usually from 90 to 200 emu/g, preferably from 110 to 170 emu/g. The water content of the magnetic particles is from 0.1 to 5%, and is preferably optimized according to the kind of the binder used. The ferromagnetic metal particles have a pH of from 4 to 12, with the optimum pH varying depending on the kind of the binder used. The preferred range of the pH thereof is from 6 to 10. The magnetic particles may contain soluble inorganic ions, e.g., ions of Na, Ca, Fe, Ni, or Si; these ions do not particularly influence the properties of the magnetic particles as long as the content thereof is 500 ppm or less.

For producing the ferromagnetic metal particles, use may be made of, e.g., the goethite method, vacuum evaporation method, liquid-phase reduction method. Although any of such methods is usable in this invention, preferred methods include the goethite method.

Ferromagnetic particles that can be used in a lower magnetic layer are then explained below.

Known ferromagnetic particles may be used in a lower magnetic layer. Examples thereof include γ-FeOx (x=1.33–1.5) and Co-modified γ-FeOx (x=1.33–1.5). Preferred of these are the Co-modified γ-FeOx. Besides the atoms specified above, the ferromagnetic particles may contain other atoms such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, and Nb.

Before being dispersed, the fine ferromagnetic particles may be treated with, for example, a dispersant, a lubricant, a surfactant, or an antistatic agent. These treatments are described in, for example, JP-B-44-14090, JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-48-39639, and U.S. Pat. Nos. 3,026,215, 3,031,341, 3,100,194, 3,242,005, and 3,389,014 (the term "JP-B" as used herein means an "examined Japanese patent publication").

The ferromagnetic particles in the lower layer have a specific surface area as determined by the BET method of from 25 to 80 m$^2$/g, preferably from 40 to 70 m$^2$/g. Specific surface areas thereof less than 25 m$^2$/g are undesirable because an increased noise results; while specific surface areas thereof more than 80 m$^2$/g are undesirable because satisfactory surface properties are difficult to obtain. The σs of the magnetic iron oxide particles is 50 emu/g or more, preferably 70 emu/g or more; while the σs of the fine ferromagnetic metal particles is preferably 100 emu/g or more, more preferably from 110 to 170 emu/g. The coercive force thereof is preferably from 500 to 2,500 Oe, more preferably from 800 to 2,000 Oe.

The tap density of γ-iron oxide is preferably 0.5 g/ml or more, more preferably 0.8 g/ml or more. In alloy particles, the tap density thereof is preferably from 0.2 to 0.8 g/ml. Tap densities of alloy particles more than 0.8 g/ml tend to result in acceleration of the oxidation of the ferromagnetic particles during compaction, so that a sufficient σs is difficult to obtain. The lower magnetic layer preferably has a coercive force of from 500 to 2,500 Oe.

The tap density of γ-iron oxide is preferably 0.5 g/ml or higher, more preferably 0.8 g/ml or higher. Tap densities thereof below 0.5 g/ml tend to result in insufficient dispersibility. In the case of using γ-iron oxide, the proportion of divalent iron to trivalent iron is preferably from 0 to 40%, more preferably from 5 to 30%. The amount of cobalt atoms is from 0 to 15%, preferably from 2 to 8%, based on the amount of iron atoms.

It is preferred that the lower magnetic layer usually have a coercive force of from 500 to 2,500 Oe, a squareness ratio of from 0.6 to 0.95, a Br of from 1,000 to 3,000 G (gauss), and an SFD of 0.6 or less.

If the magnetic recording medium of the present invention has a lower magnetic layer, this layer itself preferably has a center-line average surface roughness of 0.006 µm or less. The upper layer formed on the lower layer also preferably has a surface roughness of 0.006 µm or less.

The nonmagnetic layer is explained below.

The inorganic nonmagnetic particles for use in the lower layer of the magnetic recording medium of the present invention can be selected from inorganic compounds such as metal oxides, metal carbonates, metal sulfates, metal nitrides, metal carbides, and metal sulfides. Specific examples of the inorganic compounds include α-alumina having an α-alumina structure content of 90% or more, β-alumina, γ-alumina, silicon carbide, chromium oxide, cerium oxide, α-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. These may be used alone or in combination. Particularly preferred are titanium dioxide, zinc oxide, iron oxide, and barium sulfate. The particle sizes of these nonmagnetic particles are preferably from 0.005 to 2 μm. Also, it is possible to use a combination of two or more kinds of nonmagnetic particles having different particle sizes if needed. Alternatively, the same effect can be produced by using one kind of nonmagnetic particles having a wide particle diameter distribution. The especially preferred range of the particle size is from 0.01 to 0.2 μm. The tap density thereof is from 0.05 to 2 g/ml, preferably from 0.2 to 1.5 g/ml. The water content thereof is from 0.1 to 5%, preferably from 0.2 to 3%. The pH thereof is from 2 to 11, preferably from 6 to 9. The specific surface area thereof is from 1 to 100 m$^2$/g, preferably from 5 to 50 m$^2$/g, and more preferably from 7 to 40 m$^2$/g. The crystallite size thereof is preferably from 0.01 to 2 μm. The oil absorption thereof as measured with DBP is from 5 to 100 ml/100 g, preferably from 10 to 80 ml/100 g, and more preferably from 20 to 60 ml/100 g. The specific gravity thereof is from 1 to 12, preferably from 3 to 6. The particle shape thereof may be any of the acicular, spherical, polyhedral, platy, or hexagonal platy shapes. In acicular particles, the aspect ratio thereof is preferably from 2 to 15. The ignition loss thereof is preferably 20% or less. The inorganic particles for use in the present invention preferably have a Mohs' hardness of from 4 to 10. The roughness factors of the surfaces of these particles are preferably from 0.8 to 1.5, more preferably from 0.9 to 1.2. The SA (stearic acid) adsorption thereof is from 1 to 20 μmol/m$^2$, preferably from 2 to 15 μmol/m$^2$. The nonmagnetic particles for use in the lower layer preferably have a heat of wetting by water of from 200 to 600 erg/cm$^2$ at 25° C. A solvent which gives a heat of wetting in the above range can be used. The appropriate number of water molecules present on the surfaces thereof at 100° to 400° C. is from 1 to 10 per 100 Å$^2$. The isoelectric-point pH thereof in water is preferably from 3 to 6. The surfaces of these particles are preferably treated with $Al_2O_3$, $SiO_2$, $TiO_2$, $ZrO_2$, $SnO_2$, $Sb_2O_3$, or ZnO. Of these, $Al_2O_3$, $SiO_2$, $TiO_2$ and $ZrO_2$ are preferred from the standpoint of dispersibility, with $Al_2O_3$, $SiO_2$, and $ZrO_2$ being particularly preferred. These may be used in combination or alone. A treated surface layer formed by coprecipitation may be used according to purpose. It is also possible to use a treated surface layer having a structure formed by first treating with alumina and then treating the resulting surface layer with silica, or to use a treated surface layer having a structure which is the reverse of the above structure. Although the treated surface layer may be made porous if needed, a homogeneous and dense surface layer is generally preferred.

Specific examples of inorganic nonmagnetic particles for use in the present invention include UA5600, UA5605, and Nanotite manufactured by Showa Denko K.K.; AKP-20, AKP-30, AKP-50, HIT-55, HIT-100, and ZA-G1 manufactured by Sumitomo Chemical Co., Ltd.; G5, G7, and S-1 manufactured by Nippon Chemical Industrial Co., Ltd.; TF-100, TF-120, TF-140, R516, DPN250, and DPN250BX manufactured by Toda Kogyo Co., Ltd.; TTO-51B, TTO-55A, TTO-55B, TTO-55C, TTO-55S, TTO-55D, FT-1000, FT-2000, FTL-100, FTL-200, M-1, S-1, SN-100, R-820, R-830, R-930, R-550, CR-50, CR-80, R-680, and TY-50 manufactured by Ishihara Sangyo Kaisha, Ltd.; ECT-52, STT-4D, STT-30D, STT-30, and STT-65C manufactured by Titan Kogyo K.K.; T-1 manufactured by Mitsubishi Material Co., Ltd.; NS-O, NS-3Y, and NS-8Y manufactured by Nippon Shokubai Kagaku Kogyo Co., Ltd.; MT- 100S, MT-100T, MT-150W, MT-500B, MT-600B, and MT-100F manufactured by Teika Co., Ltd.; FINEX-25, BF-1, BF-10, BF-20, BF-1L, and BF-10P manufactured by Sakai Chemical Industry Co., Ltd.; DEFIC-Y and DEFIC-R manufactured by Dowa Mining Co., Ltd.; and Y-LOP manufactured by Titan Kogyo K.K. and nonmagnetic particles obtained by calcining them.

Especially preferred inorganic nonmagnetic particles are titanium dioxide. Accordingly, titanium dioxide is described in detail with respect to production processes thereof. Titanium dioxide products are produced mainly by a sulfuric acid process and a chlorine process. In the sulfuric acid process, a raw ore of ilmenite is leached with sulfuric acid to extract, e.g., Ti, Fe as sulfates. The iron sulfate is removed by crystallization, and the remaining titanyl sulfate solution is purified by filtration and then subjected to hydrolysis with heating to thereby precipitate hydrous titanium oxide. This precipitate is separated by filtration and then washed to remove impurities. Calcination of the resulting precipitate at 80° to 1,000° C. after addition of a particle size regulator or the like gives crude titanium oxide. The titanium oxide is divided to a rutile form and an anatase form according to the nucleating agent added in hydrolysis. This crude titanium oxide is ground, sieved, and subjected to, e.g., surface treatment, thereby to produce a titanium dioxide product. In the chlorine process, natural or synthetic rutile is used as the raw ore. The ore is chlorinated under high-temperature reducing conditions to convert the Ti to $TiCl_4$ and the Fe to $FeCl_2$, and the iron chloride is solidified by cooling and separated from the liquid $TiCl_4$. The crude $TiCl_4$ obtained is purified by rectification and a nucleating agent is added thereto. This crude $TiCl_4$ instantaneously reacts with oxygen at a temperature of 1,000° C. or more to obtain crude titanium oxide. For imparting pigmenting properties to the crude titanium oxide yielded in the above oxidative decomposition step, the same finishing technique as in the sulfuric acid process is employed. The surface treatment of the titanium oxide material may be conducted as follows. The material is dry-ground, and water and a dispersant are then added thereto. The resulting slurry is subjected to wet grinding, followed by centrifugal separation to separate coarse particles. The resulting slurry of fine particles is then transferred to a surface treatment tank, where surface covering with a metal hydroxide is performed. First, an aqueous solution of a predetermined amount of a salt of, e.g., Al, Si, Ti, Zr, Sb, Sn, or Zn, is added to the slurry and an acid or alkali is added to neutralize the resulting slurry to thereby form a hydrous oxide and cover the surfaces of the titanium oxide particles with the oxide. The water-soluble salts formed as by-products are removed by decantation, filtration, and washing. The slurry is subjected to final pH adjustment, filtration, and washing with pure water. The resulting cake is dried with a spray dryer or band dryer. Finally, the dry particles are ground with a jet mill to give a product. In place of such a wet process, the surface treatment can be conducted by passing vapors of $AlCl_3$ and $SiCl_4$ through titanium oxide particles and then passing water vapor to treat the particle surfaces with Al and Si. With respect to processes for the production of other pigments, reference may be made to *Characterization of Powder Surfaces*, published by Academic Press.

Carbon black may be incorporated into the lower layer, whereby the known effect of reducing Rs can be produced. For this purpose, carbon black, such as furnace black for rubbers, thermal black for rubbers, coloring black, and acetylene black, can be used. The specific surface area of the carbon black is from 100 to 500 $m^2/g$, preferably from 150 to 400 $m^2/g$, and the DBP absorption thereof is from 20 to 400 ml/100 g, preferably from 30 to 200 ml/100 g. The particle diameter thereof is from 5 to 80 mμ, preferably from 10 to 50 mμ, and more preferably from 10 to 40 mμ. The carbon black preferably has a pH of from 2 to 10, a water content of from 0.1 to 10%, and a tap density of from 0.1 to 1 g/ml. Specific examples of carbon black for use in the present invention include BLACKPEARLS 2000, 1300, 1000, 900, 800, 880, 700, and VULCAN XC-72 manufactured by Cabot Corporation; #3050B, #3150B, 3250B, #3750B, #3950B, #950, #650B, #970B, #850B, and MA-600 manufactured by Mitsubishi Chemical Corp.; CONDUCTEX SC manufactured by Columbia Carbon Co.; RAVEN 8800, 8000, 7000, 5750, 5250, 3500, 2100, 2000, 1800, 1500, 1255, and 1250 manufactured by RAVEN CO.; and Ketjen Black EC manufactured by Lion Akzo Co., Ltd. The carbon black may be surface-treated with a dispersant or another agent or grafted with a resin before use. Carbon black whose surfaces have been partly graphitized may also be used. Further, before being added to a coating fluid, the carbon black may be dispersed into a binder. The carbon black can be used in an amount of 50% or less by weight based on the inorganic particles and 40% or less based on the total weight of the nonmagnetic layer. The carbon black can be used alone or in combination. With respect to carbon blacks usable in the present invention, reference may be made to, for example, *Carbon Black Binran* (*Carbon Black Handbook*), edited by Carbon Black Association.

Organic particles for use in the present invention include acrylic-styrene resin particles, benzoguanamine resin particles, melamine resin particles, and phthalocyanine pigments. Other usable examples thereof include polyolefin resin particles, polyester resin particles, polyamide resin particles, polyimide resin particles, and poly(ethylene fluoride) resins. For producing these organic particles, techniques such as those described in JP-A-62-18564 and JP-A-60-255827 can be used.

It should be noted that although an undercoat layer is provided in ordinary magnetic recording media, this undercoat layer, which has a thickness of 0.5 μm or less, is intended to improve adhesion between the support and the magnetic or another layer and is different from the lower layer in the present invention. In the present invention, an undercoat layer is preferably provided to improve adhesion between the lower layer and the support.

The same binders, lubricants, dispersants, additives, solvents, and dispersing techniques as those for the magnetic layer can be used for the nonmagnetic layer. In particular, with respect to the amounts and kinds of binders and the amounts and kinds of additives and dispersants, known techniques usable for magnetic layers can be applied. The thickness of the nonmagnetic layer is from 0.2 to 5 μm, preferably from 1 to 3 μm.

The binder for use in the upper layer and the lower layer in the present invention may be a conventionally known thermoplastic resin, thermosetting resin, or reactive resin, or a mixture thereof.

The thermoplastic resin may be one having a glass transition temperature of from $-100°$ to $150°$ C., a number-average molecular weight of from 1,000 to 200,000, preferably from 10,000 to 100,000, and a degree of polymerization of about from 50 to 1,000. Examples of the thermoplastic resins include polymers or copolymers containing a structural unit derived from vinyl chloride, vinyl acetate, vinyl alcohol, maleic acid, acrylic acid, acrylic ester, vinylidene chloride, acrylonitrile, methacrylic acid, methacrylate, styrene, butadiene, ethylene, vinyl butyral, vinyl acetal, or vinyl ether, polyurethane resins, and various rubber-type resins.

Examples of the thermosetting or reactive resin include phenolic resins, epoxy resins, thermosetting polyurethane resins, urea resins, melamine resins, alkyd resins, reactive acrylic resins, formaldehyde resins, silicone resins, epoxy-polyamide resins, mixtures of polyester resin and isocyanate prepolymer, mixtures of polyester polyol and polyisocyanate, and mixtures of polyurethane and polyisocyanate. These resins are described in detail in *Plastic Handbook* published by Asakura Shoten. It is also possible to use a known resin of the electron beam-curing type for each of the layers. Examples of the resins and production processes therefor are described in detail in JP-A-62-256219.

The resins enumerated above can be used alone or in combination. Preferred examples of those include combinations of a polyurethane resin with at least one member selected from vinyl chloride resins, vinyl chloride-vinyl acetate resins, vinyl chloride-vinyl acetate-vinyl alcohol resins, and vinyl chloride-vinyl acetate-maleic anhydride copolymers, and combinations of these with polyisocyanate.

The polyurethane resins may have a known structure such as polyester polyurethane, polyether polyurethane, polyether polyester polyurethane, polycarbonate polyurethane, polyester polycarbonate polyurethane, or polycaprolactone polyurethane. For obtaining further improved dispersibility and durability, it is preferred to use one or more of the above-enumerated binders which have, incorporated therein through copolymerization or addition reaction, at least one polar group selected from —COOM, —SO$_3$M, —OSO$_3$M, —P=O(OM)$_2$, —O—P=O(OM)$_2$ (wherein M represents a hydrogen atom or an alkali metal salt group), —OH, —NR$_2$, —N$^+$R$_3$ (wherein R represents a hydrocarbon group), epoxy group, —SH, and —CN, if needed. The amount of the polar group is from $10^{-1}$ to $10^{-8}$ mol/g, preferably from $10^{-2}$ to $10^{-6}$ mol/g.

Specific examples of those binders for use in the present invention include VAGH, VYHH, VMCH, VAGF, VAGD, VROH, VYES, VYNC, VMCC, XYHL, XYSG, PKHH, PKHJ, PKHC, and PKFE manufactured by Union Carbide Corp.; MPR-TA, MPR-TA5, MPR-TAL, MPR-TSN, MPR-TMF, MPR-TS, MPR-TM, and MPR-TAO manufactured by Nisshin Chemical Industry Co., Ltd.; 1000W, DX80, DX81, DX82, DX83, and 100FD manufactured by Denki Kagaku Kogyo K.K.; MR-105, MR110, MR100, and 400X-110A manufactured by Nippon Zeon Co., Ltd.; Nippolan N2301, N2302, and N2304 manufactured by Nippon Polyurethane Industry Co. Ltd.; Pandex T-5105, T-R3080, T-5201, Burnock D-400, D-210-80, Crisvon 6109, and 7209 manufactured by Dainippon Ink & Chemicals, Inc.; Vylon UR8200, UR8300, UR8600, UR5500, UR4300, RV530, and RV280 manufactured by Toyobo Co., Ltd.; Daipheramin 4020, 5020, 5100, 5300, 9020, 9022, and 7020 manufactured by Dainichiseika Color & Chemicals Mfg., Co., Ltd.; MX5004 manufactured by Mitsubishi Chemical Corp.; Sunprene SP-150, TIM-3003, and TIM-3005 manufactured by Sanyo Chemical Industries, Co., Ltd.; and Saran F310 and F210 manufactured by Asahi Chemical Industry Co., Ltd.

The amount of the binder used in the nonmagnetic layer or in the lower or upper magnetic layer in the present invention is from 5 to 50% by weight, preferably from 10 to 30% by weight, based on the amount of the nonmagnetic particles or the ferromagnetic particles, respectively. In employing a vinyl chloride resin, it is preferred to use the vinyl chloride resin in an amount of from 5 to 30% by weight in combination with from 2 to 20% by weight of polyurethane resin and from 2 to 20% by of weight polyisocyanate. In using polyurethane in the present invention, this resin preferably has a glass transition temperature of from −50° to 100° C., an elongation at break of from 100 to 2,000%, a stress at break of from 0.05 to 10 kg/cm², and a yield point of from 0.05 to 10 kg/cm². The magnetic recording medium of the present invention has one or more layers. It is possible to form the nonmagnetic layer and the magnetic layers so that these layers differ from each other in binder amount, the proportion of a vinyl chloride resin, polyurethane resin, polyisocyanate, or another resin in the binder, the molecular weight of each resin contained in each magnetic layer, polar group amount, the aforementioned physical properties of resin according to need. For attaining this, known techniques concerning multilayered magnetic layers are applicable. For example, in the case of forming layers having different binder amounts, an increase in binder amount in the upper magnetic layer is effective in diminishing the marring of the upper magnetic layer surface; while an increase in binder amount in either the upper magnetic layer or the lower nonmagnetic layer to impart flexibility is effective in improving head touching.

Examples of the polyisocyanate for use in the constituent layers of the magnetic recording medium of the present invention include isocyanates such as tolylene diisocyanate, 4,4,'-diphenylmethane diisocyanate, hexamethylene diisocyanate, xylylene diisocyanate, naphthylene 1,5-diisocyanate, o-toluidine diisocyanate, isophorone diisocyanate, and triphenylmethane triisocyanate, products of the reactions of these isocyanates with polyalcohols, and polyisocyanates formed through condensation of isocyanates. These isocyanates are commercially available under the following trade names: Coronate L, Coronate HL, Coronate 2030, Coronate 2031, Millionate MR, and Millionate MTL manufactured by Nippon polyurethane Co., Ltd.; Takenate D-102, Takenate D-110N, Takenate D-200, and Takenate D-202 manufactured by Takeda Chemical Industries, Ltd.; and Desmodule L, Desmodule II, Desmodule N, and Desmodule HL manufactured by Sumitomo Bayer Co., Ltd. For each of the layers, these polyisocyanates may be used alone, or used in combination of two or more thereof, taking advantage of a difference in curing reactivity.

The carbon black for use in the magnetic layer in the present invention includes furnace black for rubbers, thermal black for rubbers, coloring black, and acetylene black. The carbon black preferably has a specific surface area of from 5 to 500 m²/g, a DBP absorption of from 10 to 400 ml/100 g, a particle diameter of from 5 to 300 mμ, a pH of from 2 to 10, a water content of from 0.1 to 10%, and a tap density of from 0.1 to 1 g/ml. Specific examples of carbon black for use in the present invention include BLACKPEARLS 2000, 1300, 1000, 900, 800, 700, and VULCAN XC-72 manufactured by Cabot Corporation; #80, #60, #55, #50, and #35 manufactured by Asahi Carbon Co., Ltd.; #2400B, #2300, #900, #1000, #30, #40, and #10B manufactured by Mitsubishi Chemical Corp.; and CONDUCTEX SC manufactured by Columbia Carbon Co.; and RAVEN 150, 50, 40, and 15 manufactured by RAVEN, CO. These carbon blacks may be surface-treated with a dispersant or another agent or grafted with a resin before use. Carbon black whose surfaces have been partly graphitized may also be used. Further, before being added to a magnetic coating fluid, the carbon black may be dispersed into a binder. These carbon blacks can be used alone or in combination. The carbon black is preferably used in an amount of from 0.1 to 30% by weight based on the amount of the ferromagnetic particles. The carbon black incorporated in the magnetic layer functions to prevent static buildup in the layer, to reduce the coefficient of friction of the layer, as a light screen for the layer, and to improve the strength of the layer. Such effects are produced to different degrees depending on the kind of carbon black used. Therefore it is, of course, possible in the present invention to properly use carbon blacks according to the purpose so as to give an upper magnetic layer, a lower nonmagnetic layer, and a lower magnetic layer which differ in the kind, amount, and combination of carbon blacks, on the basis of the above-described properties including particle size, oil absorption, electrical conductivity, and pH. Examples of the carbon blacks for use in the present invention are described in, for example, *Carbon Black Binran* (*Carbon Black Handbook*) edited by Carbon Black Association.

Examples of abrasive materials for use in the present invention include known abrasive materials mostly having a Mohs' hardness of 6 or more can be used alone or in combination. Examples thereof include α-alumina having an α-alumina structure content of 90% or more, β-alumina, silicon carbide, chromium oxide, cerium oxide, α-iron oxide, corundum, artificial diamond, silicon nitride, silicon carbide, titanium carbide, titanium oxide, silicon dioxide, and boron nitride. A composite made up of two or more of these abrasive materials (e.g., one obtained by surface-treating one abrasive material with another) may also be used. Although in some cases these abrasive materials contain compounds or elements other than the main component, the same effect is obtained with such abrasive materials as long as the content of the main component is 90% or more. These abrasive materials preferably have a particle size of from 0.01 to 2 μm. If needed, abrasive materials having different particle sizes may be used in combination, or a single abrasive material having a widened particle diameter distribution may be used so as to produce the same effect. The abrasive material preferably has a tap density of from 0.3 to 2 g/ml, a water content of from 0.1 to 5%, a pH of from 2 to 11, and a specific surface area of from 1 to 30 m²/g. Although abrasive materials that can be used in the present invention may have any particle shape selected from the acicular, particulate, spherical, and cubical forms, a particle shape having a sharp corner as part of the contour is preferred because abrasive materials of this shape have high abrasive properties.

Part or all of the additives to be used in the present invention may be added at any step in a process for producing a magnetic or nonmagnetic coating fluid. For example, it is possible: to mix the additives with ferromagnetic particles prior to a kneading step; to add the additives during the kneading of ferromagnetic particles, a binder, and a solvent; to add the additives at a dispersing step; to add the additives after dispersion; or to add the additives immediately before coating. There are cases where the purpose is achieved by applying part or all of the additives, according to the purpose, by simultaneous or successive coating after magnetic layer application. Further, it is possible, according to purpose, to apply a lubricant on the magnetic layer surface after calendering or slitting.

Examples of marketed lubricant products for use in the present invention include NAA-102, NAA-415, NAA-312, NAA-160, NAA-180, NAA-174, NAA-175, NAA-222, NAA-34, NAA-35, NAA-171, NAA-122, NAA-142, NAA-160, NAA-173K, hardened castor oil fatty acid, NAA-42, NAA-44, Cation SA, Cation MA, Cation AB, Cation BB, Naymeen L-201, Naymeen L-202, Naymeen S-202, Nonion E-208, Nonion P-208, Nonion S-207, Nonion K-204, Nonion NS-202, Nonion NS-210, Nonion HS-206, Nonion L-2, Nonion S-2, Nonion S-4, Nonion O-2, Nonion LP-20R, Nonion PP-40R, Nonion SP-60R, Nonion OP-80R, Nonion OP-85R, Nonion LT-221, Nonion ST-221, Nonion OT-221, Monoguri MB, Nonion DS-60, Anon BF, Anon LG, butyl stearate, butyl laurate, and erucic acid manufactured by NOF Corporation; oleic acid manufactured by Kanto Chemical Co., Ltd.; FAL-205 and FAL-123 manufactured by Takemoto Yushi Co., Ltd.; Enujerub LO, Enujerub IPM, and Sansosyzer E4043 manufactured by Shin Nihon Rika Co., Ltd.; TA-3, KF-96, KF-96L, KF-96H, KF410, KF420, KF965, KF54, KF50, KF56, KF-907, KF851, X-22-819, X-22-822, KF905, KF700, KF393, KF-857, KF-860, KF-865, X-22-980, KF-101, KF-102, KF-103, X-22-3710, X-22-3715, KF-910, and KF-3935 manufactured by Shin-Etsu Chemical Co., Ltd.; Armide P, Armide C, and Armoslip CP manufactured by Lion Ahmer Co., Ltd.; Duomin TDO manufactured by Lion Fat and Oil Co., Ltd.; BA-41G manufactured by Nisshin Oil Mills Co., Ltd..; and Profan 2021E, Newpole PE61, Ionet MS-400, Ionet MO-200, Ionet DL-200, Ionet DS-300, Ionet DS-1000, and Ionet DO-200 manufactured by Sanyo Chemical Co., Ltd.

Examples of organic solvents for use in the present invention include ketones such as acetone, methyl ethyl ketone, methyl isobutyl ketone, diisobutyl ketone, cyclohexanone, isophorone, and tetrahydrofuran; alcohols such as methanol, ethanol, propanol, butanol, isobutyl alcohol, isopropyl alcohol, and methylcyclohexanol; esters such as methyl acetate, butyl acetate, isobutyl acetate, isopropyl acetate, ethyl lactate, and glycol acetate; glycol ethers such as glycol dimethyl ethers, glycol monoethyl ethers, and dioxane; aromatic hydrocarbons such as benzene, toluene, xylene, cresol, and chlorobenzene; chlorinated hydrocarbons such as methylene chloride, ethylene chloride, carbon tetrachloride, chloroform, ethylene chlorohydrin, and dichlorobenzene; and other compounds such as N,N-dimethylformamide and hexane. These solvents may be used in arbitrary proportions. These organic solvents need not be 100% pure, and may contain impurities, such as isomers, unreacted raw materials, by-products, decomposition products, oxidation products, and water, besides the main components. The content of these impurities is preferably 30% or less, more preferably 10% or less. It is preferred in the present invention that the organic solvent used for the upper layer be of the same kind as that used for the lower layer. Different solvent amounts may be used for the two layers. It is important that solvents having higher surface tensions (e.g., cyclohexanone, dioxane) should be used for the lower layer to enhance the stability of coating. Specifically, the arithmetic mean thereof for the upper layer solvents should be not lower than that for the lower layer solvents. From the standpoint of improving dispersibility, solvents which are polar to some degree are preferred, and a preferred solvent composition is one at least 50% of which is accounted for by one or more solvents having a dielectric constant of 15 or more. The solubility parameter is preferably from 8 to 11.

The thickness of the nonmagnetic support is from 1 to 100 µm, preferably from 4 to 20 µm. The total thickness of the upper magnetic layer and the nonmagnetic layer is from 1/100 to 2 times the thickness of the nonmagnetic support. An undercoat layer may be provided between the nonmagnetic support and the lower layer in order to improve adhesion. The thickness of this undercoat layer is from 0.01 to 2 µm, preferably from 0.02 to 0.5 µm. Further, a back coat layer may be provided on the nonmagnetic support on the side opposite to the magnetic layer. The thickness of this back coat layer may be from 0.1 to 2 µm, preferably from 0.3 to 1.0 µm. These undercoat layer and back coat layer may be the same as known ones. The nonmagnetic support for use in the present invention may be a known film. Examples thereof include films of polyesters such as poly(ethylene terephthalate) and poly(ethylene naphthalate), polyolefins, cellulose triacetate, polycarbonates, polyamides, polyimides, poly(amide-imide)s, polysulfone, aramids, aromatic polyamides, and polybenzoxazole. In using a thin support having a thickness of 7 µm or less, the support is preferably made of a high-strength material such as poly (ethylene naphthalate) or polyamide. If needed, a laminate support such as that described in JP-A-3-224127 may be used in order that the magnetic layer surface and the base surface have different surface roughnesses. These supports may be subjected beforehand to, e.g., corona discharge treatment, plasma treatment, adhesion-promoting treatment, heat treatment, dust-removing treatment. In order to attain the objects of the present invention, it is preferred to employ a nonmagnetic support having a center-line average surface roughness of 0.03 µm or less, preferably 0.01 µm or less, and more preferably 0.005 µm or less, as measured at a cut-off of 0.08 mm. In addition to the requirement of low center-line average surface roughness, the nonmagnetic supports are required to be preferably free from projections as large as 1 µm or more. The state of the surface roughness of the support can be freely controlled by changing the size and amount of a filler which is incorporated into the support if needed. Examples of the filler include oxides or carbonates of Ca, Si, and Ti and fine organic particles such as acrylic particles. The support preferably has a maximum height SRmax of 1 µm or less, a ten-point average roughness SRz of 0.5 µm or less, a center-plane peak height SRp of 0.5 µm or less, a center-plane valley depth SRv of 0.5 µm or less, a center-plane areal ratio SSr of from 10% to 90%, and an average wavelength Sλa of from 5 µm to 300 µm. The number of surface projections having a size of from 0.01 to 1 µm present on these supports can be controlled with a filler of from 0 to 2,000 per 0.1 mm$^2$.

The nonmagnetic support for use in the present invention preferably has an F-5 value in the tape running direction of from 5 to 50 kg/mm$^2$ and an F-5 value in the tape width direction of from 3 to 30 kg/mm$^2$. Although the F-5 value in the tape length direction is generally higher than that in the tape width direction, this does not apply in the case where the width-direction strength, in particular, should be enhanced. The degrees of thermal shrinkage of the support in the tape running direction and in the tape width direction are preferably 3% or less, more preferably 1.5% or less, under conditions of 100° C. and 30 minutes, and are preferably 1% or less, more preferably 0.5% or less, under conditions of 80° C. and 30 minutes. The strength at break thereof in each of both directions is preferably from 5 to 100 kg/mm$^2$, and the modulus thereof is preferably from 100 to 2,000 kg/mm$^2$.

A process for preparing a magnetic coating fluid to be used for producing the magnetic recording medium of the present invention comprises at least a kneading step and a dispersing step, and may further comprise a mixing step that may be conducted, if needed, before and after the two steps. Each step may include two or more stages. Each of the materials for use in the present invention, including ferromagnetic particles, inorganic nonmagnetic particles, binder, carbon black, abrasive material, antistatic agent, lubricant, and solvent, may be added in any step either at the beginning of or during the step. Further, the individual raw materials may be added portion-wise in two or more steps. For example, a polyurethane may be added portion-wise in each of the kneading step, the dispersing step, and the mixing step for viscosity adjustment after the dispersion. Conventionally known manufacturing techniques can, of course, be used as part of the process to attain the object of the present invention. Use of a kneading machine having high kneading power, such as a continuous kneader or pressure kneader, in the kneading step is advantageous because improved gloss is obtained. In using a continuous kneader or pressure kneader, the ferromagnetic or nonmagnetic particles are kneaded together with all or part (preferably at least 30%) of the binder, the binder amount being in the range of from 15 to 500 parts by weight per 100 parts by weight of the ferromagnetic particles. Details of this kneading treatment are given in JP-A-1-166338 and JP-A-64-79274. For preparing a coating fluid for the nonmagnetic layer, use of a dispersing medium having a high specific gravity is preferable. A preferred example thereof is zirconia beads.

The following constitutions can be proposed as exemplary coating apparatuses and methods for producing multilayered magnetic recording media such as that of the present invention.

1. A lower layer is first applied with a coating apparatus commonly used for magnetic coating fluid application, e.g., a gravure coating, roll coating, blade coating, or extrusion coating apparatus, and an upper layer is then applied, while the lower layer is in a wet state, by means of a support-pressing extrusion coater such as those disclosed in JP-B-1-46186, JP-A-60-238179, and JP-A-2-265672.

2. An upper layer and a lower layer are applied almost simultaneously using a single coating head having therein two slits for passing coating fluids, such as those disclosed in JP-A-63-88080, JP-A-2-17971, and JP-A-2-265672.

3. An upper layer and a lower layer are applied almost simultaneously with an extrusion coater equipped with a back-up roll, such as that disclosed in JP-A-2-174965.

In order to prevent the electromagnetic characteristics and other properties of the magnetic recording medium from being impaired by aggregation of ferromagnetic particles, shearing is preferably applied to the coating fluid present in the coating head by a method such as those disclosed in JP-A-62-95174 and JP-A-1-236968. The viscosity of each coating fluid should be in the range as specified in JP-A-3-8471.

In the present invention, the methods described above are preferably used for producing a multilayered magnetic recording medium. Also in the case of forming two magnetic layers and one nonmagnetic layer, each of the above-described methods is easily applicable to the formation of these three layers. It is, however, possible to use a method in which a nonmagnetic layer is applied and dried before a lower magnetic layer and an upper magnetic layer are simultaneously formed thereon, or a method in which a nonmagnetic layer and a lower magnetic layer are simultaneously formed and dried before an upper magnetic layer is formed thereon.

A known orientation apparatus may be used for producing the magnetic recording medium of the present invention.

However, like-pole-facing cobalt magnets, unlike-pole-facing cobalt/solenoid magnets, and superconducting magnets are preferred. During the application of a magnetic field, the amount of the organic solvent contained in the coating is preferably regulated to a value within the range specified hereinabove by controlling the temperature and amount of the air fed for drying or by controlling the rate of coating. In other words, it is preferred that the place in which the coating is dried be made controllable. The rate of coating is from 20 to 1,000 m/min, preferably from 100 to 800 m/min, and more preferably from 200 to 600 m/min, and the temperature of the drying air is usually from 40° to 100° C., preferably from 60° to 100° C., and more preferably from 80° to 100° C. As stated above, predrying may be performed to an appropriate degree before the coated support enters the magnet zone.

Examples of calendering rolls that can be used for producing the magnetic recording medium of the present invention include rolls of a heat-resistant plastic, e.g., epoxy, polyimide, polyamide, or poly(imide-amide), and metal rolls. Preferred is calendering with metal rolls. The calendering temperature is usually from 20° to 150° C., preferably from 70° to 120° C., and more preferably from 80° to 110° C. The linear pressure is usually from 50 to 500 kg/cm, preferably from 200 to 400 kg/cm, and more preferably from 250 to 400 kg/cm.

The magnetic recording medium of the present invention has the following properties. The coefficients of friction of the upper magnetic layer surface and the opposite side surface with SUS420J are 0.5 or less, preferably 0.3 or less, throughout the temperature range of from −10° C. to 40° C. and the humidity range of from 0% to 95%. The surface resistivity on both sides is preferably from $10^4$ to $10^{12}$ Ω/sq, and the electrification potential thereof is preferably from −500 V to 500 V. The modulus at 0.5% elongation of the upper magnetic layer is preferably from 100 to 2,000 kg/mm$^2$ in both the running and width directions, and the strength at break thereof is preferably from 1 to 30 kg/cm$^2$. The modulus of the magnetic recording medium is preferably from 100 to 1,500 kg/mm$^2$ in both running and width directions, the residual elongation thereof is preferably 0.5% or less, and the thermal shrinkage thereof at temperature of 100° C. or less is preferably 1% or less, more preferably 0.5% or less, and especially preferably 0.1% or less. The glass transition temperature (the temperature at which the loss modulus in a dynamic viscoelasticity measurement at 110 Hz becomes maximum) of the upper magnetic layer is preferably from 50° to 120° C., while that of the lower nonmagnetic or lower magnetic layer is preferably from 0° to 100° C. The loss modulus is preferably from 1×10$^8$ to 8×10$^9$ dyne/cm$^2$, and the loss tangent is preferably 0.2 or less. Too large loss tangents tend to result in troubles due to sticking. The residual solvent content in the upper layer is preferably 100 mg/m$^2$ or less, more preferably 10 mg/m$^2$ or less. It is preferred that the residual solvent content in the upper layer be lower than that in the lower layer. The void content in each of the upper layer and the lower layer is preferably 30% by volume or less, more preferably 20% by volume or less. Although a lower void content is preferable for attaining higher output, there are cases where a certain degree of void content is preferred according to purpose. For example, in the case of a magnetic recording medium for data recording use where suitability for repeated running operations is important, higher void contents in most cases bring about better running durability.

The upper layer has a center-line surface roughness Ra of 0.008 µm or less, preferably 0.003 µm or less, and an RMS surface roughness $R_{RMS}$ as determined with an AFM is preferably from 2 nm to 15 nm. The upper layer has preferably a maximum height SRmax of 0.5 μm or less, a ten-point average roughness SRz of 0.3 μm or less, a center-plane peak height SRp of 0.3 μm or less, a center-plane valley depth SRv of 0.3 μm or less, a center-plane areal ratio SSr of from 20% to 80%, and an average wavelength SλA of from 5 μm to 300 μm. The upper layer surface may have from 0 to 2,000 projections having a size of from 0.01 μm to 1 μm. The number of these projections can be easily controlled, for example, by regulating the surface irregularities of the support with a filler or by the surface irregularities of calendering rolls.

The magnetic recording medium of the present invention, which preferably has a lower layer and an upper layer, can be made to have a difference in physical property between the lower layer and the upper layer according to purpose, as can be easily presumed. For example, the upper layer is made to have a heightened modulus to improve running durability and, at the same time, the lower layer is made to have a lower modulus than the upper layer to improve the head touching of the magnetic recording medium.

dropwise to the mixture with stirring to adjust the pH thereof to 10. Two hours after, the reaction mixture was filtered, and the solid was washed with water and dried to obtain goethite particles treated with the metal salts and the sintering inhibitor. Into a rotary kiln having a capacity of 30 liters was introduced 1.5 kg of the goethite particles. The particles were dehydrated at 550° C. for 6 hours, while nitrogen gas was kept being passed through the kiln at a rate of 30 l/min. The temperature in the kiln was then lowered to 400° C., and hydrogen gas was introduced in place of nitrogen at a rate of 60 l/min. Reduction was thus initiated and continued until the water content in the recovered hydrogen gas became nil. Thereafter, nitrogen gas was introduced in place of hydrogen at a rate of 30 l/min to cool the contents to room temperature. A nitrogen/oxygen mixed gas having an oxygen concentration of 100 ppm was introduced into the kiln at a rate of 10 l/min for 15 hours, and the resulting ferromagnetic metal particles were then taken out into the air. Properties of the thus-obtained ferromagnetic metal particles are shown in Table 1 together with M1, M2, and the sintering inhibitor. In the table, "SSA" indicates specific surface area.

TABLE 1

| Ferro-magnetic metal particle | M1 Kind | M1 mol | M2 Kind | M2 mol | Sintering inhibitor Kind | Sintering inhibitor mol | Major-axis-length (μm) | HC (Oe) | σs (emu/g) | SSA (M²/g) |
|---|---|---|---|---|---|---|---|---|---|---|
| A | Si | 0.5 |    |     | Al/Si     | 0.5/0.5     | 0.2  | 1650 | 135 | 45 |
| B | Ni | 1   | CO | 4   | Al/B      | 1/1         | 0.17 | 1680 | 143 | 53 |
| C | Zn | 1   |    |     | Al/Y      | 1/1         | 0.13 | 1390 | 126 | 55 |
| D | CO | 1.5 | CO | 4.5 | Al/Y      | 0.5/1.5     | 0.11 | 1950 | 145 | 58 |
| E | Zn | 2   | CO | 2   | Al/Si/La  | 0.3/0.5/1.2 | 0.09 | 1820 | 125 | 55 |
| F | Zn | 2   | CO | 4   | Al/Y      | 0.5/1.5     | 0.09 | 1900 | 136 | 59 |
| G | Zn | 2   |    |     | Al/Nd     | 0.5/1.5     | 0.09 | 1750 | 123 | 61 |
| H | Zn/Si | 1/1 | CO | 6 | Al/Y      | 0.3/1.7     | 0.1  | 2060 | 130 | 65 |
| I | CO/Zn | 1/1.5 |  |   | Al/Y      | 0.3/2.5     | 0.06 | 1860 | 116 | 56 |
| J | CO/Zn | 1/2 | CO | 5  | Al/Y      | 0.3/2.8     | 0.05 | 2350 | 125 | 53 |

The present invention is explained below by the following examples, but the invention is not construed as being limited thereto. In the examples, all parts, percents, ratios and the like are by weight unless otherwise indicated.

EXAMPLES

Production of Ferromagnetic Metal Particles

Ferrous sulfate was added to a metal salt (M1), and this mixture in an amount of 20 mol in terms of the amount of the sum of iron and the metal was dissolved with stirring in 60 liters of water placed in a 200-liter reaction tank, while nitrogen gas was bubbled into the water. An aqueous solution of sodium hydroxide was introduced into the reaction tank in such an amount that the reaction mixture amounted to 110 liters and that the content of unreacted hydroxyl groups in the reaction mixture became 1 mol/l. The temperature of the reaction mixture was regulated to 20° C., and the gas bubbled into the reaction mixture was changed from nitrogen to air to conduct aeration at a rate of 200 l/min. Thus, an oxidation reaction was carried out to the end point to obtain goethite particles. The resulting goethite slurry was filtered and washed with water by means of a filter press. To the resulting goethite cake was added 100 liters of water to re-slurry the goethite. Thereto was added 10 liters of an aqueous solution of a metal salt (M2) and a sintering inhibitor. A 6-N solution of sodium hydroxide was added Production of Coating Fluids:
In the Examples, all "parts" are by weight.

Upper Magnetic Coating Fluid X:

| | |
|---|---|
| Ferromagnetic metal particles (magnetic particles A to J) | 100 parts |
| Vinyl chloride copolymer Containing $1 \times 10^{-4}$ eq/g —$PO_3Na$ | 12 parts |
| Degree of polymerization | 300 |
| Polyester polyurethane resin | 3 parts |
| Neopentyl glycol/caprolactonepolyol/MDI = 0.9/2.6/1 Containing $1 \times 10^{-4}$ eq/g —$SO_3Na$ group | |
| α-Alumina (particle size, 0.3 μm) | 2 parts |
| Carbon black (particle size, 0.015 μm) | 5 parts |
| Butyl stearate | 1 part |
| Stearic acid | 2 parts |
| Methyl ethyl ketone | 125 parts |
| Cyclohexanone | 125 parts |

Lower Magnetic Coating Fluid Y:

| | |
|---|---|
| Fine ferromagnetic iron oxide particles | 100 parts |
| Composition, Co-adsorbed iron oxide | |
| Hc | 800 Oe |
| BET specific surface area | 45 m²/g |
| Crystallite size | 200 Å |
| Surface-treating agent | 5 wt % $Al_2O_3$, 2 wt % $SiO_2$ |
| Particle size | 0.12 μm |

-continued

Production of Coating Fluids:
In the Examples, all "parts" are by weight.

| | |
|---|---|
| (major-axis length) | |
| Aspect ratio | 8 |
| σs | 76 emu/g |
| Vinyl chloride copolymer | 12 parts |
| Containing 1 × 10$^{-4}$ eq/g —SO$_3$Na | |
| Degree of polymerization | 300 |
| Polyester polyurethane resin | 3 parts |
| Neopentyl glycol/caprolactonepolyol/MDI = 0.9/2.6/1 | |
| Containing 1 × 10$^{-4}$ eq/g —SO$_3$Na group | |
| α-Alumina (particle size, 0.3 μm) | 2 parts |
| Carbon black (particle size, 0.10 μm) | 0.5 parts |
| Butyl stearate | 1 part |
| Stearic acid | 5 parts |
| Methyl ethyl ketone | 100 parts |
| Cyclohexanone | 20 parts |
| Toluene | 60 parts |
| Nonmagnetic Coating Fluid Z: | |
| Inorganic nonmagnetic particles, TiO$_2$ | 80 parts |
| Crystal system | rutile |
| Average primary-particle diameter | 0.035 μm |
| BET specific surface area | 40 m$^2$/g |
| pH | 7 |
| TiO$_2$ content | 90% or higher |
| DBP absorption | 27–28 ml/100 g |
| Surface-treating agent | 8 wt % Al$_2$O$_3$ |
| Carbon black | 20 parts |
| Average primary-particle diameter | 16 mμ |
| DBP absorption | 80 ml/100 g |
| pH | 8.0 |
| BET specific surface area | 250 m$^2$/g |
| Volatile content | 1.5% |
| Vinyl chloride copolymer | 12 parts |
| Containing 1 × 10$^{-4}$ eq/g —SO$_3$Na | |
| Degree of polymerization | 300 |
| Polyester polyurethane resin | 5 parts |
| Neopentyl glycol/caprolactonepolyol/MDI = 0.9/2.6/1 | |
| Containing 1 × 10$^{-4}$ eq/g —SO$_3$Na group | |
| Butyl stearate | 1 part |
| Stearic acid | 1 part |
| Methyl ethyl ketone/cyclohexanone (8/2 mixed solvent) | 250 parts |

With respect to each of the above three coating fluids, the ingredients were kneaded with a continuous kneader and then dispersed with a sand mill. To the resulting dispersions was added a polyisocyanate in an amount of 3 parts for nonmagnetic coating fluid Z and in an amount of 5 parts for each of upper magnetic coating fluid X and lower magnetic coating fluid Y. The dispersions were filtered through a filter having an average opening diameter of 1 μm. Thus, lower nonmagnetic coating fluid Z, upper magnetic coating fluid X, and lower magnetic coating fluid Y were prepared.

Production of Magnetic Recording Media

Example 1

A poly(ethylene naphthalate) support having a thickness of 7 μm and a center-line surface roughness of 0.002 μm was coated by simultaneous double coating with nonmagnetic coating fluid Z at a dry thickness of 3 μm and with upper magnetic coating fluid X at a dry thickness of 0.2 μm. The coated support was passed through an orientation zone which had a 1 m-long solenoid magnet having a magnetic force of 3,000 G and to which 100° C. dry air was continuously fed. Thus, orientation was performed together with drying. Thereafter, the web was calendered with a 7-roll calender in which all the rolls were metal rolls, at a temperature of 100° C. The calendered web was slit into a 8-mm width to produce a 8-mm video tape. The magnetic recording media respectively corresponding to the ferromagnetic metal particles used in upper magnetic coating fluid X are referred to tape Nos. 1 to 10 (Nos. 1, 3, and 8 are Comparative Examples and the other tapes are Examples).

Example 2

Tape No. 12 containing magnetic particle G was produced in the same manner as in Example 1, except that magnetic coating fluid Y was used in place of nonmagnetic coating fluid Z. The magnetic properties and HK of this medium were regarded as the same as those of tape No. 7, which had a lower nonmagnetic layer, because those properties were influenced by the ferromagnetic particles contained in the lower layer.

Example 3

A poly(ethylene naphthalate) support having a thickness of 7 μm and a center-line surface roughness of 0.002 μm was coated only with magnetic coating fluid X (containing magnetic particle H or J) at a dry thickness of 3.0 μm. The subsequent procedure was carried out in the same manner as in Example 1 to produce tape No. 11 (Comparative Example) and tape No. 13 (Example).

The tapes obtained were evaluated by the methods described below.

Evaluation Methods
(Magnetic Properties)

Measurements were made in an applied magnetic field of 10 kOe with VSM-5, manufactured by Toei Kogyo Co., LTd.
(HK)

Using torquemeter TRT-2, manufactured by Toei Kogyo Co., Ltd., a demagnetized sample was examined for rotational hysteresis loss Wr from a low intensity of magnetic field to 10 kOe. The values of Wr were plotted against the reciprocal of intensity of applied magnetic field, 1/H, and the intensity of applied magnetic field at which Wr became 0 on the higher magnetic-intensity side was determined by extrapolating a straight portion of the Wr curve; this intensity was taken as HK. The values of Rh and HP (the intensity of magnetic field at the peak of the Wr curve) which were obtained from the same measurement are given in Table 2.
(Electromagnetic Characteristics)

Using an 8-mm video deck FUJIX8, manufactured by Fuji Photo Film Co., Ltd., 10-MHz signals were recorded. The recorded signals were reproduced and the output thereof was measured with an oscilloscope. Tape No. 1 was used as the reference, with the output value therefor being taken as 0 dB.

The results obtained are shown in Table 2.

TABLE 2

| Tape No. | Magnetic particle used | Hc (Oe) | Bm (gauss) | SQ | Hc/HK | HK (Oe) | Rh | HP (Oe) | Output (dB) | C/N (dB) |
|---|---|---|---|---|---|---|---|---|---|---|
| 1 | A | 1710 | 4200 | 0.81 | 0.26 | 6615 | 1.9 | 2050 | 0.0 | 0.0 |
| 2 | B | 1750 | 4520 | 0.88 | 0.32 | 5469 | 1.5 | 2140 | 1.8 | 1.3 |
| 3 | C | 1420 | 4050 | 0.87 | 0.33 | 4303 | 1.6 | 1480 | 0.4 | 0.8 |
| 4 | E | 2010 | 4620 | 0.86 | 0.35 | 5743 | 1.3 | 2260 | 1.6 | 1.8 |
| 5 | E | 1890 | 3860 | 0.88 | 0.36 | 5250 | 1.2 | 2260 | 1.8 | 2.1 |
| 6 | F | 1960 | 4650 | 0.87 | 0.45 | 4356 | 0.9 | 2250 | 2.6 | 2.8 |
| 7 | G | 1820 | 4080 | 0.85 | 0.42 | 4333 | 1.1 | 1960 | 2.5 | 3.0 |
| 8 | H | 2160 | 4360 | 0.86 | 0.23 | 9391 | 2.0 | 2430 | 0.7 | 1.2 |
| 9 | I | 1980 | 4160 | 0.83 | 0.53 | 3736 | 0.7 | 2310 | 2.6 | 3.2 |
| 10 | J | 2380 | 4860 | 0.84 | 0.62 | 3839 | 0.6 | 2780 | 3.2 | 3.6 |
| 11 | H | 2100 | 4180 | 0.83 | 0.25 | 8400 | 2.2 | 2450 | −0.1 | 0.2 |
| 12 | G | 1820 | 4080 | 0.85 | 0.42 | 4333 | 1.1 | 1960 | 2.8 | 3.4 |
| 13 | J | 2340 | 4520 | 0.81 | 0.60 | 3900 | 0.7 | 2670 | 2.6 | 2.7 |

The magnetic recording media satisfying the constitutional requirements of the present invention showed an increased output, even when they had a multilayered coating in which the lower layer was a nonmagnetic layer, or had a multilayered coating in which the lower layer was a magnetic layer, or had a single-layer coating consisting of a magnetic layer. The magnetic recording media which did not satisfy the constitutional requirements of the invention showed a relatively low output. Tapes containing ferromagnetic metal particles having smaller major-axis lengths tended to have higher C/N ratios. The magnetic recording media in which the Hc/HK ratio, Hc, and the major-axis length of the particles were within the respective ranges specified in this invention showed excellent performances including a high output and a high C/N ratio.

The results show that a magnetic recording medium according to the present invention which has a magnetic layer containing ferromagnetic metal particles and remarkably improved not only in electromagnetic characteristics, especially in short-wavelength output necessary to high-density recording, which property has long been required of magnetic recording media, but also in C/N can be provided by regulating the magnetic layer so as to have a coercive force Hc of from 1,500 to 4,000 Oe and an Hc/HK ratio, where HK is the anisotropy field, of from 0.30 to 1.00.

While the invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon at least a magnetic layer comprising ferromagnetic metal particles dispersed in a binder, wherein the magnetic layer has a coercive force, Hc, of from 1,500 to 4,000 Oe an Hc/HK ratio of Hc to an anisotropy field, HK, of from 0.30 to 1.00, and an HK value of 3,736 Oe or more, wherein the ferromagnetic particles have a major-axis length of from 0.01 to 0.30 μm.

2. The magnetic recording medium as claimed in claim 1, wherein the magnetic layer comprising the ferromagnetic metal particles is provided on either a nonmagnetic layer which is formed on the nonmagnetic support and which comprises inorganic nonmagnetic particles dispersed in a binder or on a magnetic layer which is formed on the nonmagnetic support and which comprises ferromagnetic particles dispersed in a binder.

3. The magnetic recording medium as claimed in claim 1, wherein the ferromagnetic metal particles are magnetic particles produced using a sintering inhibitor.

4. The magnetic recording medium as claimed in claim 1, wherein the ferromagnetic metal particles are magnetic particles produced using at least one element selected from the group consisting of Al, Si, Y, and Nd as a sintering inhibitor.

5. The magnetic recording medium as claimed in claim 1, wherein the ferromagnetic particles have a major-axis length of from 0.01 to 0.15 μm.

6. The magnetic recording medium as claimed in claim 1, wherein the ferromagnetic particles have a major-axis length of from 0.03 to 0.08 μm.

* * * * *